United States Patent Office — 2,785,075 — Patented Mar. 12, 1957

2,785,075
QUICK FREEZING OF FOODS

George J. Malecki, Wellesley Hills, Mass.

No Drawing. Application December 30, 1953,
Serial No. 401,377

3 Claims. (Cl. 99—192)

This invention pertains to the cooling of food products and consists in particular of a novel method of cooling or freezing such materials. Related subject matter is also disclosed in my co-pending applications Serial No. 398,409 and Serial No. 398,410, both filed December 15, 1953.

Quick freezing of foods is generally carried out by conducting the heat from the food to a refrigerated medium in thermal contact with the food. Contact may be indirect, for instance through a metal wall as in a multiple plate freezer, or it may be direct such as in brine, syrup or air blast freezing. Each of these types of freezing methods has a major drawback. In liquid-cooled, direct freezing the liquid frequently penetrates into the food and changes its flavor. Air blast freezers are relatively slow and cause dehydration of the food. In addition they require frequent defrosting of the coils. Multiple plate and belt freezers are costly and the freezing rate attained by them is generally slow.

The present invention provides a method of freezing or cooling foods which is both rapid and free of the disadvantages of prior art methods. In particular, the food is protected against desiccation and deterioration from oxidation or microbal action, and is, moreover, not contacted with a coolant fluid such as would affect the flavor. Foods of all sorts may easily be frozen, including many which cannot be frozen satisfactorily by prior art methods. The process may, however, be used for pre-cooling, without freezing, foods such as fruits, vegetables, meats and sea food, prior to cold storage, and in such applications has the advantage of protecting the food during storage from desiccation and deterioration effects of oxidation and microbal action.

The apparatus required for the process is relatively light and compact, and may accordingly be easily transported. The process may accordingly be carried out on shipboard where sea foods may be frozen immediately after being caught.

In general the process of the invention consists in covering the surface of the food with a layer of an aqueous dispersion of a hydrophilic polymer, and then subjecting the food to a vacuum to cause the water from the dispersion to evaporate and its temperature to be reduced. Where the food is to be frozen the vacuum is at a pressure lower than the vapor pressure of ice, such that evaporation of the water results in freezing of the food. Where cooling without freezing is desired, the pressure may be correspondingly higher. The layer of the aqueous dispersion of the hydrophilic polymer should accordingly be sufficiently thick to provide an amount of water which will, upon evaporation under vacuum, extract the desired amount of heat. Since the heat extracted by the evaporation of one pound of water will freeze about six pounds of water, the thickness of a suitable layer of gel can readily be approximated from the water content and surface area of the food to be frozen.

Suitable hydrophilic polymers include, for instance, agar, Irish moss, Iceland moss, pectin, starch, algin, zein, gluten, gelatin, methylcellulose, carboxymethylcellulose, water-soluble ethylcellulose, hydroxyethylcellulose, polyvinyl alcohol, polyacrylic resins, urea-formaldehyde resins, carob seed, quince seed, gum arabic, gum senegal, gum tragacanth, gum karya, gum karaya, gum guar, locust bean gum, and other well known water-dispersible colloidal materials.

In preferred embodiments of this invention gel-forming polymers are employed, since upon thawing they are retained as a coating which is not objectionable, whereas nongel-forming materials (thickeners) tend to form a sticky or slimy coating which is desirably removed before consumption. A typical preferred gel-forming material is agar in a concentration of 1½ to 3%, alone or in admixture with 1% carboxymethylcellulose of high viscosity (such as that designated C. M. C. Hercules—70 D High). The viscosity of the aqueous dispersion should be such that a layer of the desired thickness is retained on the surface of the food, this thickness being generally dependent upon the amount of cooling desired and the size of the particles of food. For peas having a diameter in the range of about 5 mm., an aqueous dispersion having a viscosity of between 100 and 500 cps. is suitable for forming a layer of approximately one-half mm. in thickness. Upon evaporation of the water from such a layer the peas are readily frozen entirely while leaving a thin, partially dry coating on their surface which serves to protect them from desiccation and oxidative deterioration in storage.

Suitable viscosities and concentrations of the aqueous dispersion of the polymer may readily be selected in each case by simple experimentation to assure a layer of sufficient thickness to effect the desired amount of cooling.

Polymer dispersions of this type are particularly suitable treating agents for foods since they have generally a low osmotic pressure because of their high molecular weights, and therefore cause no appreciable exosmosis of liquid from the food. Electrolytes and low molecular weight solutes, such as sugar, should not be present in concentrations higher than isotonic.

A typical procedure illustrative of this invention as carried out in the quick freezing of peas is given in the following example.

The peas are first precooled to a temperature of between about 35 and 40° F. and are immersed in an aqueous 1½% agar dispersion containing 1% carboxymethylcellulose as a thickener, at a temperature of between 50° C. and 95° C., such that each pea is individually coated. In removing the peas from the dispersion they are preferably heated to prevent the immediate formation of gel, and for this purpose a conveyor which is electrically heated to a temperature of about 50 to 60° C. may be used. Each pea should be covered with a layer of agar dispersion having a thickness of about ½ mm., and the conditions of pea temperature, bath temperature and room temperature, as well as the duration of the dip, may readily be selected to achieve this result. The gel layer is then permitted to set upon cooling, which may be accelerated by applying a blast of cold air if desired.

After the agar dispersion has gelled, the peas are introduced into a vacuum chamber in which a pressure of less than 4.3 mm. Hg. is maintained. Typically the vacuum chamber is evacuated to a pressure of about 1 mm. Hg so that the peas are not only frozen but are also further chilled to a temperature of 0° F. or lower.

Although described with particular reference to the quick freezing of peas, my invention may also be carried out with other food products. Where the foods contain large quantities of occluded gases such as in the case of freezing apple slices and other fruits, it is preferable to subject the food to a vacuum of 26 to 28 inches Hg before introducing them into the aqueous dispersion, so as to remove the major portion of these gases.

This invention is also ideally suited for practice on shipboard in the freezing of freshly caught sea food such as fish, shrimp, or oysters, since the necessary equipment is simple, light and compact, consisting chiefly in a dipping tank and a vacuum pump. In treating sea food it is preferable that it be beheaded and eviscerated and preferably filleted prior to freezing. Typically the sea food prepared for freezing is covered with the aqueous dispersion of polymers as by dipping, spraying or overflowing and then allowing the dispersion to form a gel. A particularly advantageous technique is to place the sea food in shallow vessels containing the aqueous dispersion and to allow the entire volume of dispersion to set into gel form with the sea food embedded in it. The sea food covered with the gel is then subjected to a vacuum as described above and is rapidly frozen. When such sea food is prepared for use the gel layer is easily removed by the action of boiling water and an excellent food product is obtained.

The process of this invention may also be used advantageously in freezing numerous fleshy fruits and vegetables which are not satisfactorily frozen by prior art methods, such as tomatoes, cucumbers, melons and the like. The rapid vacuum freezing technique of this invention results in the formation of very small ice crystals among the cells of the food. During thawing the liquid from the melting crystals is in intimate contact with the cells while its escape is prevented by the outer gel coating. The readsorption of this liquid by the cells of the food is thereby greatly facilitated. There is thus avoided the difficulty experienced with prior efforts to freeze foods, such as tomatoes, of losing the juices during thawing by their draining from the cells before the cells have been able to readsorb them. Drainage of this sort is largely prevented by the gel coating.

Another important use of this invention is in the cooling (without freezing) of numerous food products such as shelled peas, beans, berries, grapes (all of which have outer skins) and meats, fish fillets, shrimp, lettuce, cauliflower, romaine, apples, pears, peaches and tomatoes. Cooling is also carried out by first covering the outer surface with a layer of an aqueous dispersion of a hydrophilic polymer of a viscosity adapted to provide a layer of the desired thickness, generally between about 100 and 2000 cps. A gel-forming layer of aqueous dispersion is preferably provided where the foods are sold directly to the consumer, suitable gel-forming materials being agar, locust bean gum, gum tragacanth, gum guar, gum karaya, gum karya, pectin, Irish moss, algin and similar gel-forming materials. After the gel-forming layer has been applied, the foods are subjected to a vacuum and are thereby cooled very rapidly, without dehydration, by the evaporation of water from the outer aqueous dispersion.

The amount of vacuum will, of course, depend on the amount of cooling desired, but will be at a pressure above the vapor pressure of ice, since no freezing is done. After the desired temperature has been attained, e. g. 35° F. for lettuce, meat, fish fillets or shelled peas, and 50° F. for tomatoes or bananas, the vacuum is terminated and the food may be placed in cold storage. In this manner of processing, cooling is carried out very rapidly, and a protective coating which may easily be removed by washing or blanching is also applied. The protective coating on peas is particularly advantageous in retarding respiration during storage and thereby preserving their flavor.

Where the foods being cooled contain considerable entrapped air, such as in the case of lettuce, the application of the vacuum causes passages in the gel layer to open for the escape of air, but these close again when the vacuum is released leaving the layer intact. Although described in detail with reference to preferred and illustrative embodiments of this invention, it is contemplated that obvious modification in the process will occur to those skilled in the art and that such may be made without departing from the scope of this invention. In particular one may, if desired, add to the polymer dispersion chemicals assisting the preservation of food, for instance, any of the following: calcium sulfite, calcium sulfite hydrate, calcium tartrate, magnesium sulfite hydrate, magnesium sulfite, aluminum sulfite, iron sulfite, aluminum ascorbate, iron ascorbate, calcium phosphite, magnesium phosphite, iron phosphite, aluminum phosphite, ascorbyl palmitate, sodium sulfite, sodium phosphite, sodium ascorbate, sodium thiosulfate ($Na_2S_2O_3$), sodium bisulfite ($NaHSO_3$)

sodium pyrosulfite ($Na_2S_2O_5$), potassium sulfite, potassium phosphite, potassium ascorbate, potassium thiosulfite, potassium pyrosulfite, ammonium sulfite, ammonium phosphite, assonium ascorbate, ammonium bisulfite, ascorbic acid, sulfurdioxide, phosphorous acid, ascorbyl oleate, ascorbyl laureate, ascorbyl myristibate, ascorbyl stearate, ascorbyl ricinoleate, ascorbyl arachindonate, ascorbyl linoleate, ascorbyl linolinate, ascorbyl palmitoleate, ascorbyl butyrate, ascorbyl caproate, ascorbate caprylate, ascorbyl caprate. The effects of these chemicals are more fully described in my copending applications Serial Nos. 398,409 and 398,410 referred to above.

From the foregoing description, it will be seen that this invention provides a quick freezing process which is rapid and which also results in the formation of an outer protective coating. Freezing is effected by the evaporation of water from this layer, and is thereby very fast because of the high heat of vaporization of water and the close contact between the layer and the food. The outer layer, moreover, protects the food during storage from desiccation and from the deterioration effects of oxidation and microbial action which often causes discoloration, rancidity and flavor changes. With foods having volatile aromas, the essential flavor components are also better retained by the outer layer. The appearance of the food is not adversely affected, in fact it is frequently improved by the gloss of the layer, and loose packaging of food particles individually frozen may also be easily achieved.

In addition, the process may be applied not only to foods commonly frozen by prior art methods but also to those which are not satisfactorily frozen by processes heretofore commonly used, and it may be applied at or near the places where the food is gathered since the required apparatus is light, compact and easily transported.

Having thus disclosed my invention and described in detail preferred embodiments thereof, I claim and desire to secure by Letters Patent:

1. The method of cooling food products comprising applying to the surface of the product an adhering coating of an aqueous dispersion of a hydrophilic polymer, and then subjecting the coated food product to a reduced pressure to evaporate water from the coating and thereby cool the product.

2. The method freezing a food product comprising applying to the surface of the product an aqueous dispersion of a hydrophilic polymer to form a coating of sufficient thickness that the latent heat of vaporization of the water in the coating is sufficient to freeze the food product, and then subjecting the coated food product to a vacuum to evaporate water from the coating and to freeze the food product.

3. The method of cooling food products comprising applying an aqueous dispersion of a hydrophilic polymer to the surface of the product, and then subjecting the product to a reduced pressure lower than the vapor pressure of ice, thereby to cause the extraction of heat sufficiently to freeze said product.

(References on following page)

References Cited in the file of this patent

UNITED STATES PATENTS

| | | |
|---|---|---|
| 2,337,645 | Cadwell | Dec. 28, 1943 |
| 2,425,714 | Baer | Aug. 19, 1947 |
| 2,450,645 | Doyle | Oct. 5, 1948 |
| 2,558,042 | Cornwell | June 26, 1951 |
| 2,567,085 | Stoloff | Sept. 4, 1951 |

OTHER REFERENCES

"The Refrigerating Journal," October 1953, pages 10, 12, 14, 16 and 17, article entitled Evaporative Cooling of Fruits and Vegetables, by D. H. Dewey.

"Power," June 21, 1932, article entitled Refrigerating Engineers Discuss Vacuum Refrigeration, page 931.